United States Patent [19]

Sanada et al.

[11] 4,123,324
[45] Oct. 31, 1978

[54] APPARATUS FOR DECONTAMINATING A RADIOACTIVELY CONTAMINATED COOLANT

[75] Inventors: Takahiro Sanada; Kanehiro Ochiai, both of Hitachi, Japan

[73] Assignee: Hitachi, Ltd., Japan

[21] Appl. No.: 762,265

[22] Filed: Jan. 25, 1977

[30] Foreign Application Priority Data

Feb. 2, 1976 [JP] Japan .................................. 51/9323

[51] Int. Cl.² ........................................... G21C 19/30
[52] U.S. Cl. ...................................... 176/37; 176/38
[58] Field of Search ....................... 176/37, 38, 53, 54, 176/55, 56, 46, 47, 48–49

[56] References Cited

U.S. PATENT DOCUMENTS 3,700,550  10/1972  Shiells ................................. 176/37
3,976,541  8/1976  Stiteler ............................... 176/38

Primary Examiner—Samuel W. Engle
Assistant Examiner—Ralph Palo
Attorney, Agent, or Firm—Craig & Antonelli

[57] ABSTRACT

An apparatus for decontaminating a radioactively contaminated coolant flowing through the core of a nuclear reactor wherein the coolant containing radioactively contaminated impurities is withdrawn from the core, precooled and cooled, and then the impurities are removed therefrom by ion exchange, before the coolant is returned to the core.

13 Claims, 2 Drawing Figures

APPARATUS FOR DECONTAMINATING A RADIOACTIVELY CONTAMINATED COOLANT

BACKGROUND OF THE INVENTION

This invention relates to apparatus for decontaminating a radioactively contaminated coolant, and more particularly it is concerned with an apparatus for decontaminating a radioactively contaminated coolant which circulates through the pressure vessel of a nuclear reactor of the boiling-water type nuclear power plant.

Boiling-water type nuclear power plants of the prior art generally comprise a cooling water decontaminating system for removing a radioactively contaminated ionizing metal corrosion product from cooling water flowing through the pressure vessel during operation of the reactor, and a residual heat removing system for removing, when the reactor is shut down, residual heat from the cooling water which has been heated by decay heat in the pressure vessel.

In detail, in a boiling-water type nuclear power plant, the cooling water flowing through the core of the pressure vessel is heated by decay heat of nuclear fuel in the core and produces steam which is led through a main steam line to a steam turbine where energy goes into the turbine. After giving off the energy, the steam is passed through a condenser where it is changed back into water. Recycling of the cooling water for supplying the cooling water to the core is effected by means of recycling pipe lines and a recycling pump.

The cooling water decontaminating system is constructed as follows. A portion of the cooling water of elevated temperature containing a radioactively contaminated metal corrosion product which is recycled through the recycling pipe lines when the nuclear reactor is in operation is withdrawn by means of a pump, and passed on to an ion exchanger through a heat recovery exchanger and a cooler cooled by raw water (river water). The radioactive metal corrosion product in this portion of cooling water is removed therefrom by ion exchanger. The decontaminated cooling water is sent to the heat recovery exchanger where it is subjected to heat exchange with another portion of cooling water of elevated temperature supplied thereto from the core. After being reheated in this way, the decontaminated cooling water is returned to the core of the pressure vessel.

On the other hand, the residual heat removing system which uses some pipe lines in common with a safety system for the reactor is constructed as presently to be described. Upon the nuclear reactor being shut down, the recycling pump stops its operation, so that recycling of the cooling water is stopped. At this time, a portion of the cooling water in the recycling pipe lines is delivered, by means of a pump in a coolant withdrawing pipe line, to a cooler where it is cooled by a refrigerant and returned to the core through a return pipe line. The coolant withdrawing pipe line and return pipe line each mount therein a valve, the valves being closed when it is not necessary to remove residual heat from the core, such as while the reactor is in operation. At this time, an anticorrosive agent is incorporated in the body of water in this closed system.

If the body of water in the closed system which contains an anticorrosive agent is returned as it is to the core for removing residual heat when the reactor is shut down, the anticorrosive agent will undergo thermal decomposition in the core and have some detrimental effects, such as corrosion, on the core. This is not desirable. Thus, there is the need to effect flushing prior to removing residual heat while keeping the closed system in a condition in which it is isolated from the core.

It is only after a flushing operation is performed that removal of residual heat is carried out. A flushing operation consists in washing with clean water the valves in the coolant withdrawing pipe line and return pipe line of the closed system several times. Then the anticorrosive containing cooling water is stored in a vessel made of a radiation shielding material.

We have made a discovery that, if the operation of the recycling pump is stopped, a radioactively contaminated metal corrosion product (hereinafter referred to as clad) which has hitherto been adhering to the core separates itself from the core and is incorporated in the cooling water in the pressure vessel, with the result that the concentration of the clad in the cooling water in the core becomes twenty to thirty times as high as that during operation of the reactor. Before this discovery was made, it was only the cooling water decontaminating system that was covered with a radiation shielding member, and the residual heat removing system was disposed outside the containment vessel because the possibility of incorporation of the clad in this system was not expected.

The aforementioned discovery has raised the following problems:

(1) Passing of the clad onto the residual heat removing system increases the region which is radioactively contaminated;

(2) The practice of performing decontamination of the cooling water only during operation of the reactor, which has hitherto been considered to achieve satisfactory results, cannot achieve the effect of removing the clad because no clad is incorporated in the cooling water during operation of the reactor;

(3) Installing the residual heat removing system in addition to the cooling water decontaminating system increases capital cost; and (4) The operation of removing residual heat should be performed after flushing of the pipe lines of the closed system is effected. This increases the reactor shutdown time by as much time as required for effecting flushing, thereby lowering the working rate of a reactor power plant.

SUMMARY OF THE INVENTION

An object of this invention is to provide an apparatus for decontaminating a radioactively contaminated coolant for a nuclear reactor, which is capable of avoiding an increase in the region which is contaminated by radioactively contaminated clad.

Another object is to provide an apparatus for decontaminating a radioactively contaminated coolant for a nuclear reactor, which is compact in size and low in capital cost.

Still another object is to provide an apparatus for decontaminating a radioactively contaminated coolant for a nuclear reactor, which is capable of reducing the time during which the reactor is shut down.

The outstanding characteristic of the invention is that, in withdrawing from the core of a nuclear reactor a coolant containing radioactively contaminated impurities so as to remove the impurities by ion exchange from the coolant, the coolant is subjected to ion exchange after its temperature is lowered below the level above which the ion exchange resin is denatured, and the decontaminated and cooled coolant is returend to the core as it is.

DESCRIPTION OF THE PREFERRED EMBODIMENT

Figure 1:
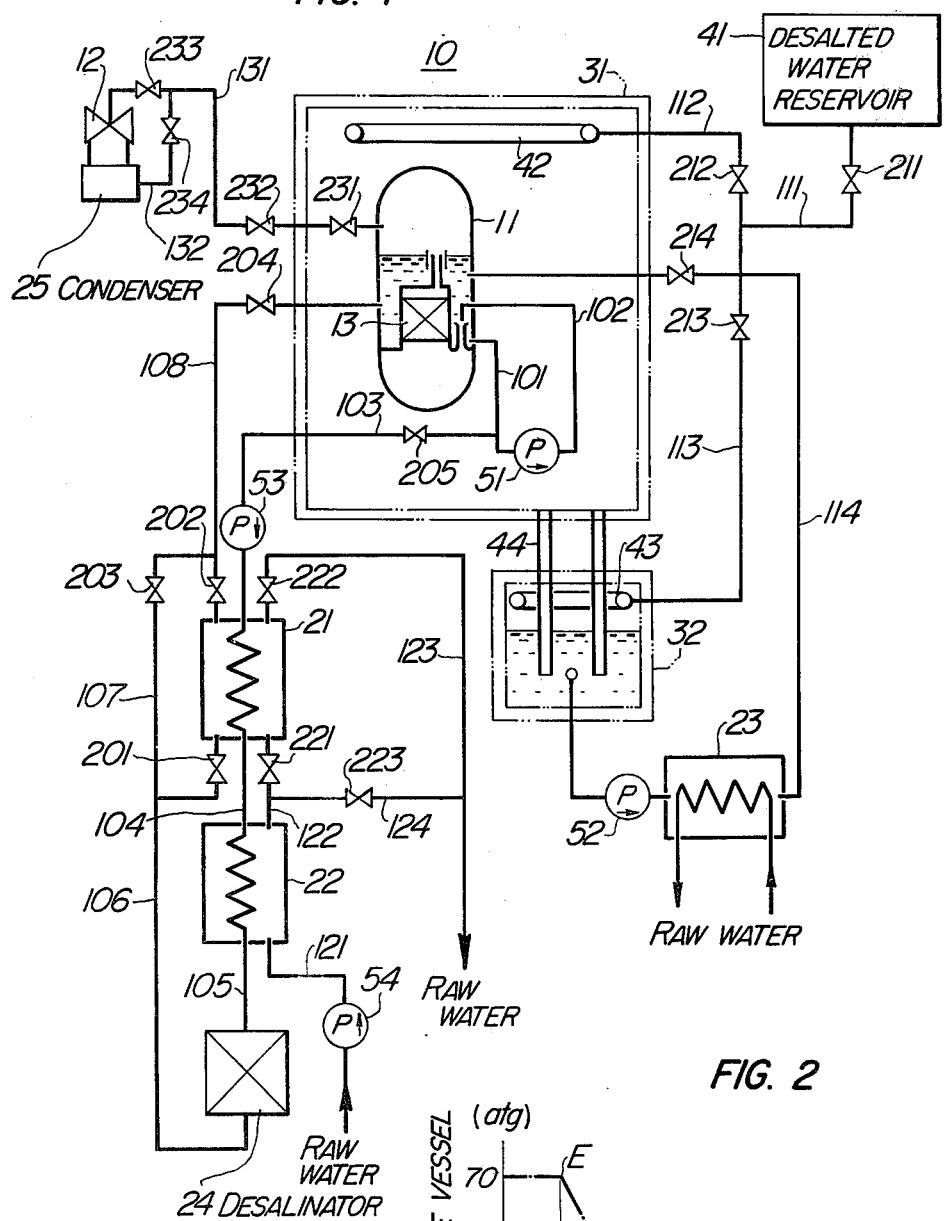
FIG. 1 is a flow sheet of a boiling-water reactor power plant having incorporated therein the apparatus for decontaminating a radioactively contaminated coolant comprising one embodiment of the invention.

To enable this invention to be better understood, the basic structure and systems of a boiling-water reactor power plant in which the invention has application will be first outlined. In FIG. 1, the reference numeral 10 generally designates a boiling-water reactor comprising a pressure vessel 11 encased in a drywell 31. The pressure vessel 11 includes therein a core 13 which is immersed in cooling water, and a plenum above the body of the cooling water. In order that the cooling water may be forcedly recycled through the core 13, the cooling water is driven through recycling pipes 101, 102 by means of pumps 51 disposed at the outside of the pressure vessel 11. The main steam system and the emergency cooling system of the reactor will now be described.

(1) Main Steam System

A turbine driving steam pipe line 131 is connected at one end thereof to the pressure vessel 11 in a position which is higher than the level of the cooling water within the pressure vessel 11 and at the other end thereof to a high pressure stage of a steam turbine 12. A pipe line 132 branches off midway of pipe line 131 to be connected to a condenser 25. Valves 231, 232 and 233 are mounted in steam supply pipe line 131, valves 231 and 232 being located near to the pressure vessel 11 while valve 233 is disposed in a position between the junction of pipe lines 131 and 132 and the steam turbine 12. A valve 234 is mounted in pipe line 132.

(2) Emergency Cooling System

A suppression chamber 32 is provided for suppressing a rise in the pressure in the drywell 31 when an accident involving leaks of the cooling water from the pressure vessel 11 occurs. The suppression chamber 32 is maintained in communication with a lower portion of the drywell 31 through venting tubes 44 and has a pool of cooling water sealedly stored therein. Mounted near the top of the suppression chamber 32 is a spraying cooler 43 which is adapted for damping the pressure in the suppression chamber 32 when an accident occurs.

A spraying cooler 42 for reducing the pressure in the drywell 31 in case of emergency, such as when an accident occurs, is disposed near the top thereof.

A cooling water supply pipe line 114 mounting therein a pump 52, a heat exchanger 23 and a valve 214 connects the suppression chamber 32 to the pressure vessel 11 for supplying cooling water from the pool of water in the suppression chamber 32 to the core 13 to prevent the melting of the nuclear fuel due to exposure in the plenum when leaks of cooling water from the pressure vessel 11 occurs.

A reservoir 41 for storing therein desalted water adapted to be used as spray water by the spraying coolers 42 and 43 is disposed outside the drywell 31. The reservoir 41 is connected to spraying cooler 42 through a pipe line 111 mounting therein a valve 211 and a pipe line 112 mounting therein a valve 212 which is disposed in series with valve 211, and connected to spraying cooler 43 through the pipe line 111 and a pipe line 113 mounting therein a valve 213 which is located in series with valve 211.

Operation of the emergency cooling system will be described. While the reactor 10 is in normal operation, the valves 231, 232 and 233 of the main steam system and the valves 211 of the emergency cooling system which is operative when leaks occur are kept open and the valve 234 of the former and the valves 212, 213 and 214 of the latter are kept closed.

If an accident involving leaks of the cooling water due to break of the recycling pipe lines 101 and 102, for example, occurs, then valve 233 is brought to a closed position while valves 212, 213, 214 and 234 are brought to an open position. Thus, all the valves except for valve 233 are opened.

First of all, the steam in the pressure vessel 11 is conducted through pipe lines 131 and 132 to the condenser 25 where it is condensed and changed back into water. The desalted water supplied from the desalted water reservoir 41 through pipe lines 111 and 112 is sprayed in the drywell 31 through spraying cooler 42.

In case of an accident, the cooling water in the pressure vessel 11 which is pressurised to 70 atg flows into the drywell 31 and instantaneously explodes therein, thereby increasing the internal pressure of the drywell 31.

Part of the steam thus produced is condensed by the sprayed water and the remainder passed through the venting tube 44 to the suppression chamber 32 where the steam is condensed by the pool of cooling water stored therein. If the temperature of the pool of water gradually rises and condensing of the steam by the pool of water reaches its limit, then part of the desalted water is passed through pipe lines 111 and 113 to spraying cooler 43 from which the desalted water is sprayed in the suppression chamber 32.

Simultaneously as the desalted water is sprayed through spraying cooler 42, the pool of water in the suppression chamber 32 is passed through the cooling water supply pipe line 114 by a pump 52 and injected into the pressure vessel 11 after being cooled by raw water at the heat exchanger 23.

Systems of the apparatus comprising a preferred embodiment of the invention will now be described in detail. A pump 53, a heat recovery exchanger 21 of the shell and tube type, a heat exchanger 22 of the shell and tube type, and a desalinator 24 provided with an ion exchange resin are arranged in series with one another in the indicated order outside the drywell 31. A desalting pipe line 103 mounting a valve 205 therein connects recycling pipe 101 to a tube in the heat recovery exchanger 21 through a pump 53.

Likewise, another desalting pipe line 104 connects tubes in the heat recovery exchanger 21 to the heat exchanger 22, while another desalting pipe line 105 connects the tube in the heat exchanger 22 to an inlet of the desalinator 24.

The desalinator 24 has an outlet which is connected, through another desalting pipe line 106, to the interior of the shell of heat recovery exchanger 21. Another desalting pipe line 108 connects the interior of the shell of heat recovery exchanger 21 to the pressure vessel 11, while still another desalting pipe line 107 mounting a valve 203 therein connects desalting pipe lines 106 and 108 together by bypassing the heat recovery exchanger 21.

A valve 201 is mounted in a section of desalting pipe line 106 between the junction of pipe lines 106 and 107 and the heat recovery exchanger 21, while a valve 202 is mounted in a section of desalting pipe line 108 between the junction of pipe lines 107 and 108 and the heat recovery exchanger 21. A valve 204 is mounted in a section of desalting pipe line 108 between the junction of pipe lines 108 and 107 and the pressure vessel 11.

A system is provided for passing raw water in series through the interior of the shell of heat exchanger 22 and the interior of the shell of heat recovery exchanger 21. More specifically, a pipe line 121 mounting a pump 54 therein connects a raw water source to the interior of the shell of heat exchanger 22, while a pipe line 122 mounting a valve 221 therein connects the interior of the shell of heat exchanger 22 to the interior of the shell of heat recovery exchanger 21. A pipe line 123 mounting a valve 222 therein connects the interior of the shell of heat recovery exchanger 21 to the raw water source. A bypass pipe line 124 mounting therein a valve 223 interconnects pipe lines 122 and 123 by short-circuiting.

After lapse of a predetermined time following shutdown of the reactor, the cooling water in the pressure vessel 11 is withdrawn by means of pump 53 through recycling pipe line 101 and valve 205. The cooling water thus withdrawn from the pressure vessel 11 is passed through the tubes in the heat recovery exchanger 21 and heat exchanger 22 and cooled, while passing through these tubes, by the raw water flowing in the interior of the shells of the heat exchangers to a temperature below the level above which the ion exchange resin is denatured. The cooling water thus cooled to a temperature below 60° C. has its ionizing slag removed therefrom by ion exchange upon reaching the desalinator 24, and the decontaminated cooling water is thereafter passed through different systems depending on whether the shutdown of the reactor is a cold shutdown wherein the temperature of the cooling water in the core is kept at about 50° C. or a hot standby wherein the temperature of the cooling water in the core is kept at about 100° C. to carry out inspection and repair of systems which has no direct bearing on the power generating system.

Where the shutdown is the cold shutdown, valves 201, 202 and 223 are closed and valves 203, 204, 205, 221 and 222 are opened. The cooling water of elevated temperature withdrawn from the core through recycling pipe 101 is precooled in the heat recovery exchanger 21 by raw water and then cooled in the heat exchanger 22 by raw water to a level below 60° C. The cooled cooling water is decontaminated at the desalinator 24 and then returned to the pressure vessel 11 through desalting pipe lines 106, 107 and 108.

Where the shutdown is the hot standby, valves 203, 221 and 222 are closed, and valves 201, 202, 204, 205 and 223 are opened. Thus the heat exchanger 22 alone is cooled by the raw water, and the decontaminated cooling water is passed through the interior of the shell of heat recovery exchanger 21 where it is heated by the cooling water from the pressure vessel 11 which passes through the tube in the heat exchanger 21. The heated cooling water is then returend to the pressure vessel 11.

It will be appreciated that the embodiment of the invention described above permits the temperature of the cooling water returned to the pressure vessel 11 to be kept at about 50° C. in case of a cold shutdown and at about 100° C. in case of a hot standby.

The embodiment of the apparatus described above operates as follows while the nuclear reactor is in operation. While the nuclear reactor is in operation, chlorine ions are produced in the core due to decay of fission fragments and tend to corrode the core. It is thus necessary to remove the chlorine ions from the cooling water in the core in order to prevent the corrosion. To this end, valves 201, 202, 204, 205 and 223 are opened and valves 203, 221 and 222 are closed. After being cooled at the heat exchanger 22 to a level below about 60° C., the cooling water withdrawn from the core has its chlorine ions removed by ion exchange at the desalinator 24 acting as an ion exchanger. After having its chlorine ions removed therefrom, the cooling water is heated at the heat recovery exchanger 21, by heat from the cooling water flowing from the core and passing through the tube in the exchanger 21, and returned back to the core 13.

Attention is drawn to the fact that, in the aforesaid embodiment of the invention, the heat recovery exchanger 21 functions as a cooler in case of a cold shutdown and as a heater in case of a hot standby.

Figure 2:
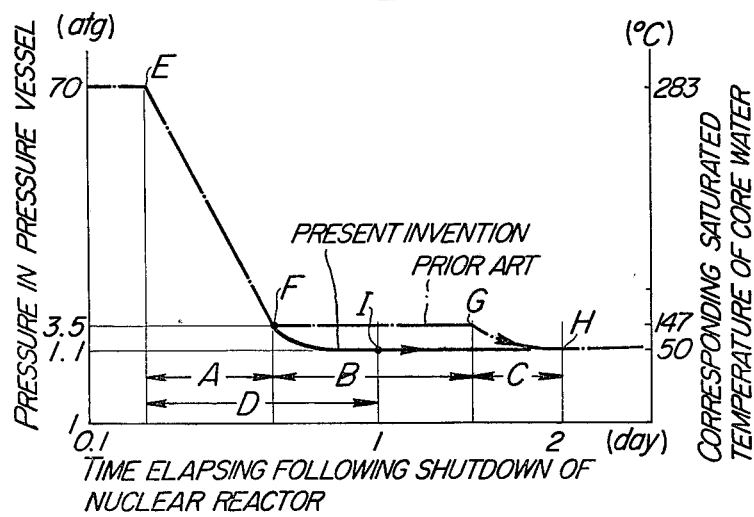
FIG. 2 is a graph showing changes that occur in chronological sequence in the internal pressure of the pressure vessel and the temperature of the cooling water flowing through the core in a nuclear reactor comprising the apparatus according to the invention and a nuclear reactor of the prior art.

FIG. 2 is a graph showing changes that occur in chronological sequence in the internal pressure of the pressure vessel 11 and the saturated temperature of cooling water (core water) from the time the reactor is started until the time it is shut down in a nuclear reactor comprising the apparatus according to the invention and a nuclear reactor of the prior art. In the graph, both the ordinates and the abscissas are shown on the logarithmic scale.

In a nuclear reactor of the prior art, the temperature of the cooling water in the pressure vessel is reduced to about 50° C. by following the steps described hereinafter. It takes a period of time A for the pressure in the pressure vessel 11 to be lowered from 70 atg, shown at a point E, at which the reactor generally operates to 3.5 atg shown at a point F. Flushing is effected at 3.5 atg during a period of time B from a point F to a point G, and thereafter residual heat is removed from the cooling water in a period of time C from the point G to a point H, so that the temperature is lowered to the desired level in a total period of A + B + C which corresponds to about two days.

On the contrary, a nuclear reactor equipped with the apparatus according to the invention can do without flushing because no anticorrosive agent is incorporated in the cooling water in the closed system. This enables the aforementioned process to take place as indicated by a line EF and a curve FI. Thus, it will be seen that the period of time D can be eliminated, so that the temperature of the cooling water in the core of the reactor can be reduced to about 50° C. in a period of time D or about one day.

In the embodiment shown in FIG. 1, an ion exchange resin is used by utiizing the ionizing capability of clad for the purpose of removing the clad from the cooling water. It is to be understood, however, that a filter of the pressure precoating type may be used with the same result. Since the filter is made of a resin, it is necessary to cool the cooling water from the core beforehand so that it has a temperature of about 60° C.

Also, in the embodiment described above, the heat contained by the cooling water withdrawn from the core is used for reheating the decontaminated cooling water. It is to be understood, however, that the invention is not limited to this form of reheating, and that any other heat sources (steam, electric heat, etc.) may be used for this purpose.

The invention has been described as using raw water (river water) for cooling purposes. However, it will be apparent to one skilled in the art that underground water or sea water may be used instead.

What is claimed is:

1. An apparatus for decontaminating a coolant for a nuclear reactor having a core of the type which is cooled by the coolant containing radioactively contaminated impurities, the coolant being in a condition in which it is heated by decay heat in the core, comprising, in combination:

means for withdrawing the coolant from the core;
   means for cooling the coolant withdrawn from the core by said withdrawing means;
   means for removing radioactively contaminated impurities from the cooled coolant from said cooling means;
   means for heating the decontaminated coolant from said impurities removing means;
   a pipe line means for returning the heated coolant from said heating means to the core;
   a bypass pipe line means bypassing said heating means and connecting said impurities removing means to said coolant returning pipe line means for supplying unheated decontaminated coolant thereto; and
   means for selectively passing the coolant from said impurities removing means through said heating means or said bypass pipe line means.

2. An apparatus for decontaminating a coolant as claimed in claim 1, wherein said heating means effects heating of the coolant by recovering heat from the coolant withdrawn from the core by said withdrawing means.

3. An apparatus for decontaminating a coolant as claimed in claim 1, wherein said impurities removing means includes an ion exchanging means.

4. An apparatus for decontaminating a coolant as claimed in claim 3, wherein said heating means effects heating of the coolant by recovering heat from the coolant withdrawn from the core by said withdrawing means.

5. An apparatus for decontaminating a coolant for a nuclear reactor having a core of the type which is cooled by the coolant containing radioactively contaminated ionizing impurities, the coolant being in a condition in which it is heated by decay heat in the core, comprising, in combination:

a pump for withdrawing the coolant from the core;
   a cooler of the shell and tube type for cooling the coolant withdrawn from the core by said pump;
   means for supplying a cooling medium to said cooler;
   an ion exchanger for removing the radioactively contaminated ionizing impurities from the coolant cooled by said cooler;
   a heater for heating the coolant decontaminated by said ion exchanger;
   a closed pipe line system connecting the core, said pump, said cooler, said ion exchanger and said heater and passing and returning the coolant from the core through said closed pipe line system to the core;
   a bypass pipe line connected to said closed pipe line system and bypassing said heater in said closed pipe line system;
   a valve mounted in said bypass pipe line; and
   at least two valves each mounted in one of two sections of said closed pipe line system between junctions of said closed pipe line system and said bypass pipe line and said heater.

6. An apparatus for decontaminating a coolant as claimed in claim 5, wherein said heater is adapted to be cooled by the same cooling medium that is supplied to said cooler from a cooling medium supply means.

7. An apparatus for decontaminating a coolant as claimed in claim 5, wherein said heater is adapted to recover heat from the coolant withdrawn from the core and delivered to said cooler.

8. An apparatus for decontaminating a coolant as claimed in claim 7, wherein said cooling medium supply means includes a raw water supply pipe line connecting said heater and said cooler in series with each other, a raw water supply bypass pipe line connected to said raw water supply pipe line and bypassing said heater, a valve mounted in said raw water supply bypass pipe line, and a plurality of valves each mounted in one of two sections of said raw water supply pipe line between junctions of said raw water supply pipe line and said raw water supply bypass line and said heater.

9. An apparatus for decontaminating a coolant for a nuclear reactor having a core of the type which is cooled by the coolant containing radioactively contaminated ionizing clad and chlorine ions, the coolant being in a condition in which it is heated by decay that in the core, comprising, in combination:

a pump for withdrawing the coolant from the core;
   a heater for recovering heat from the coolant withdrawn from the core;
   a cooler of the shell and tube type for cooling the coolant;
   an ion exchanger for removing from the coolant released from said cooler the ionizing clad while the nuclear reactor is shut down and the chlorine ions while the nuclear reactor is in operation;
   a closed pipe line system for the coolant connecting said core, said pump, said heater, said cooler, said ion exchanger and the core in series with one another in the indicated order so as to enable the coolant to flow from the core through said closed pipe line system and to return to the core;
   a coolant flow bypass pipe line connected to said closed pipe line system and bypassing said heater;
   a first valve mounted in said coolant flow bypass pipe line, said first valve being adapted to remain closed while the nuclear reactor is in operation in hot standby and to remain open while the nuclear reactor is in cold shutdown;
   a plurality of second valves each mounted in one of two sections of said closed pipe line system between junctions of said closed pipe line system and said coolant flow bypass pipe line and said heater, said plurality of second valves being adapted to remain open while the nuclear reactor is in operation and in hot standby and to remain closed while the nuclear reactor is in cold shutdown;
   a cooling raw water pipe line connecting said heater and said cooler in series with each other;

a raw water supply bypass pipe line connected to said cooling raw water pipe line and bypassing said heater;

a third valve mounted in said raw water supply bypass pipe line, said third valve being adapted to remain open while the nuclear reactor is in operation and hot standby and to remain closed while the nuclear reactor is in cold shutdown; and a plurality of fourth valves each mounted in one of two sections of said cooling raw water supply pipe line between junctions of said cooling raw water supply line and said raw water bypass pipe line and said heater, said plurality of fourth valves being adapted to remain open while the nuclear reactor is in cold shutdown and to remain close while the nuclear reactor is in operation or hot standby.

10. An apparatus for decontaminating a coolant for a nuclear reactor having a core of the type which is cooled by the coolant containing radioactively contaminated impurities, the coolant being in a condition in which it is heated by decay heat in the core, comprising, in combination:

a closed pipe line system which passes and returns the coolant from the core back to the core; and means on said pipe line system including:
a. means for cooling the coolant from the core;
b. means for removing the radioactively contaminated impurities from the coolant from said cooling means;
c. means for heating the coolant from said impurities removing means;
d. a bypass pipe line bypassing said heating means; and
e. means for selecting the path of the coolant from said impurities removing means to the core through said heating means or said bypass line.

11. An apparatus for decontaminating a coolant as claimed in claim 10, wherein said heating means is adapted to recover heat from the coolant withdrawn from the core and delivered to said cooling means.

12. An apparatus for decontaminating a coolant as claimed in claim 10, wherein said impurities removing means is an ion exchanger.

13. An apparatus for decontaminating a coolant as claimed in claim 12, wherein said heating means is adapted to recover heat from the coolant withdrawn from the core and delivered to said cooling means.

* * * * *